Inventor
JOHN BYRNE

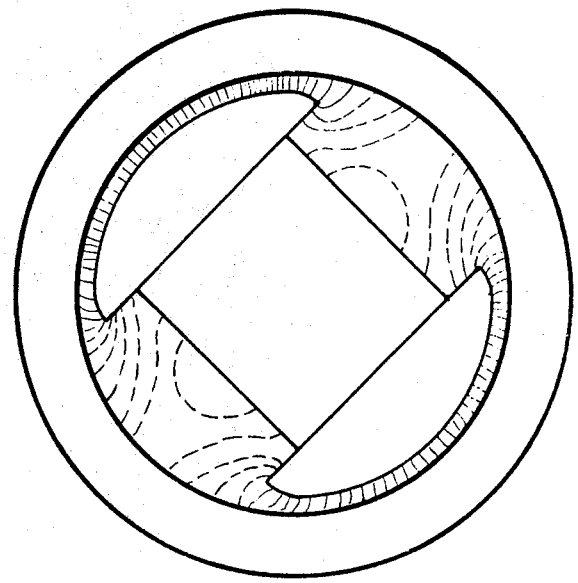

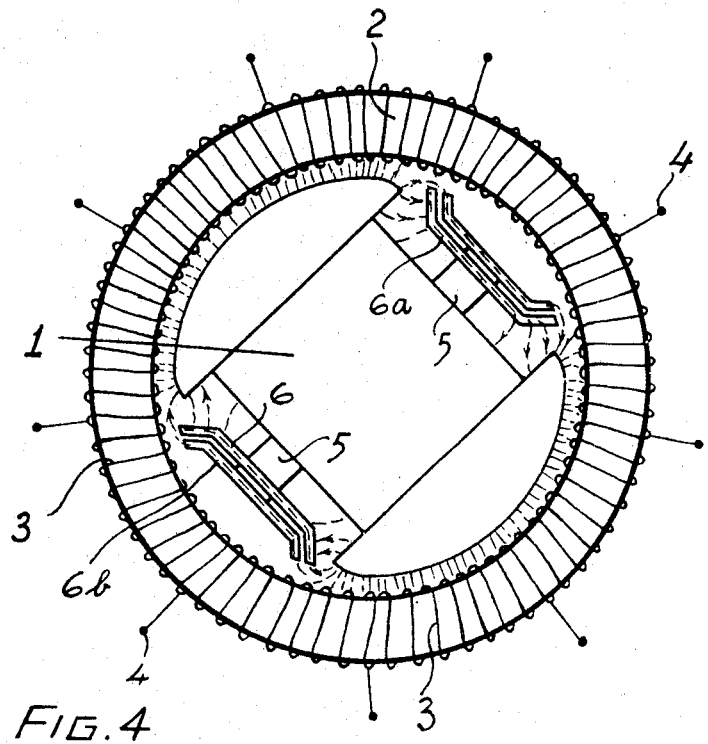
FIG.4
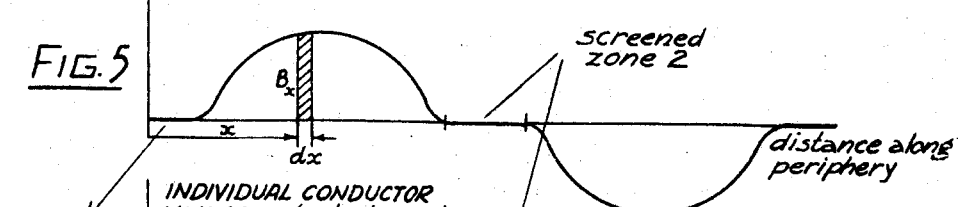
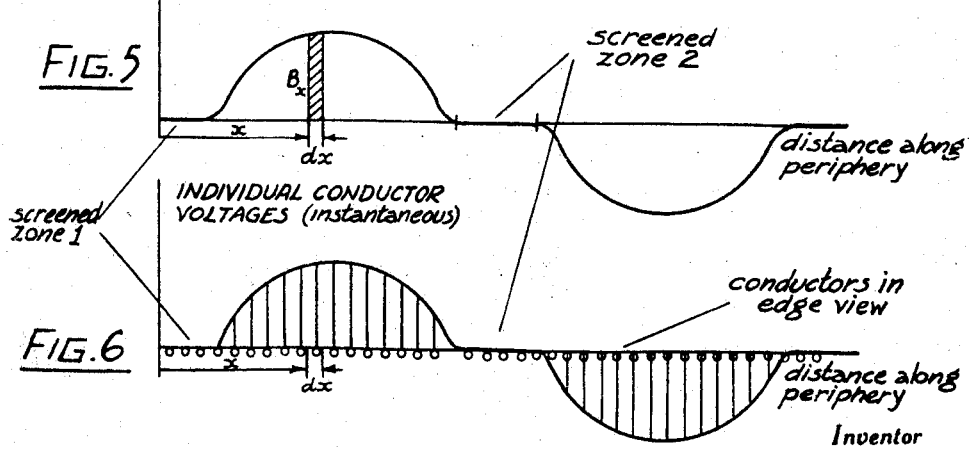
Inventor
JOHN BYRNE

United States Patent Office 3,508,094
Patented Apr. 21, 1970

3,508,094
PERMANENT MAGNET A.C. GENERATOR HAVING MODIFIED WAVE FORM OUTPUT
John Byrne, Omega 10, Saval Park Gardens,
Dalkey, County Dublin, Ireland
Continuation-in-part of application Ser. No. 667,230,
Sept. 12, 1967. This application Feb. 12, 1969, Ser.
No. 798,611
Claims priority, application Ireland, Sept. 14, 1966,
1,029/66
Int. Cl. H02k 21/00, 39/00
U.S. Cl. 310—86                                      7 Claims

ABSTRACT OF THE DISCLOSURE

An alternating current generator with permanent magnets for producing a substantially flat-topped output voltage, said generator comprising a rotor and stator combination for producing a magnetic field in the vicinity of the poles, screening elements located intermediate the generator poles for producing a pair of diametrically opposite screened zones of substantially zero flux density between the poles, a uniform winding for supporting induced voltage, equally spaced terminals on said winding, said terminals being spaced apart by an angular distance less than the angular distance defined by each of said screened zones.

---

Figure 7:
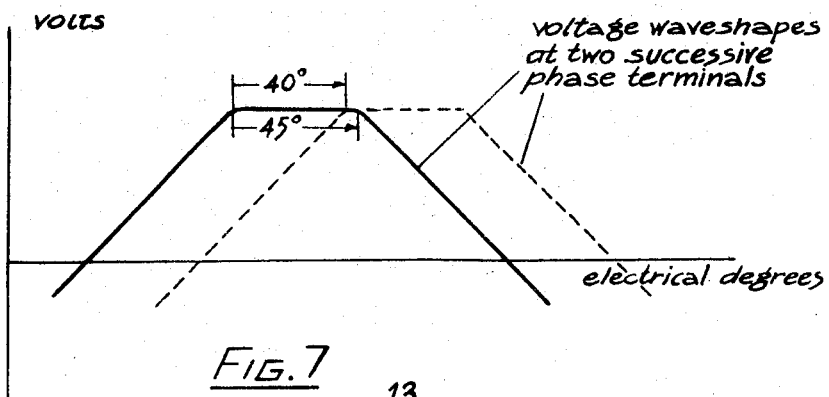

This is a continuation-in-part of my application Ser. No. 667,230, filed Sept. 12, 1967, now abandoned.

This invention relates to dynamo-electric machines and particularly to polyphase alternating current generators capable of developing an alternating current voltage having prolonged flat tops such that the rectified output has a low ripple content.

The object of the invention is to provide a generator capable of developing alternating phase voltages whose waveforms plotted against time include prolonged flat tops.

Heretofore it has been usual to generate flat-topped phase voltage by employing a field system giving a flat-topped flux waveform. There are practical limits to the degree of uniformity of flat-topped flux-distribution waveforms conveniently attainable. An alternative way of achieving a low ripple level in the rectified output has been to use a polyphase generator of conventional (i.e. nonflat-top) waveshape arranged so that the ripple output after rectification is of a high frequency so that its magnitude may be reduced by electrical filter networks. The well-known disadvantage of this scheme used as a tachogenerator is that at very low fractional speeds the ripple frequency may be of the same order as wanted components of the output, representing speed variations.

According to the present invention there is provided an alternating current generator for producing a substantially flat-topped output voltage, said generator comprising a rotor and stator combination for producing a magnetic field in the vicinity of the poles, screening elements located intermediate the generator poles for producing a pair of diametrically opposite screened zones of substantially zero flux density between the poles, a uniform winding for supporting induced voltage, equally spaced terminals on said winding, said terminals being spaced apart by an angular distance less than the angular distance defined by each of said screened zones.

In one preferred construction according to the invention, there is provided an alternating current generator for producing a substantially flat-topped output voltage, said generator comprising a permanent magnet rotor having a pair of poles and being rotatable within a stator of toroidal construction, said rotor and stator combination producing a magnetic field of high flux density in the vicinity of said poles, screening elements supported on said rotor and located intermediate said poles for producing, between said poles, a pair of diametrically opposite screened zones of substantially zero flux density extending along the inner periphery of the stator, a uniformly wound toroidal winding on said stator, and equally spaced terminals on said winding, said terminals being spaced apart by an angular distance less than the angular distance defined by each of the screened zones.

In a second preferred construction according to the invention, there is provided an alternating current generator for producing a flat-topped output voltage, said generator comprising a permanent magnet stator having a pair of poles, a rotor of toroidal construction rotatable in said stator, said rotor and stator combination producing a magnetic field predominantly in the vicinity of said poles, screening elements on said stator and located intermediate said poles for producing, between said poles, a pair of diametrically opposite screened zones of substantially zero flux density extending along the outer periphery of the rotor, a uniformly distributed toroidal winding on said rotor, and equally spaced terminals on said winding, said terminals being spaced apart by an angular distance less than the angular distance defined by each of the screened zones.

The pair of screening elements convey magnetic flux from one pole to the other pole along a path of low reluctance, the portion of each of said screening elements between the ends thereof being spaced from the periphery of the stator by a distance greater than the distance between each end of each screening element and the stator periphery.

Figure 8:
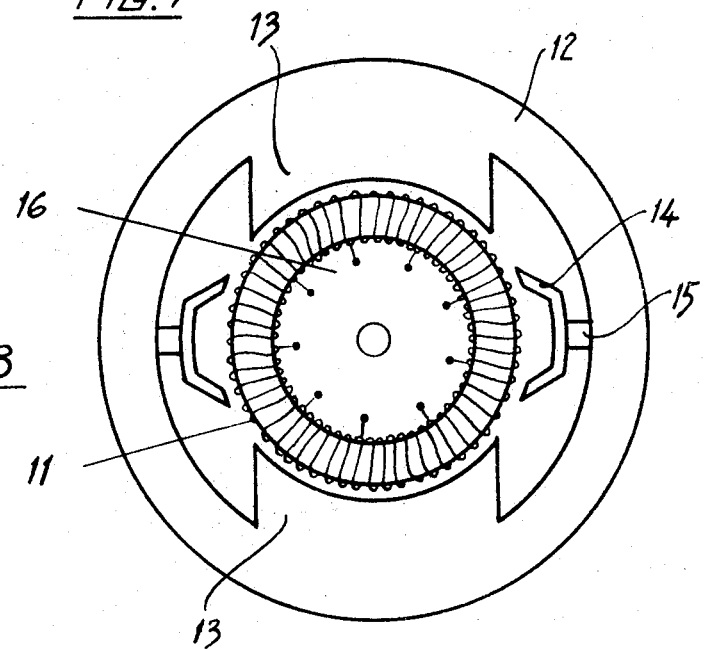
Figure 9:
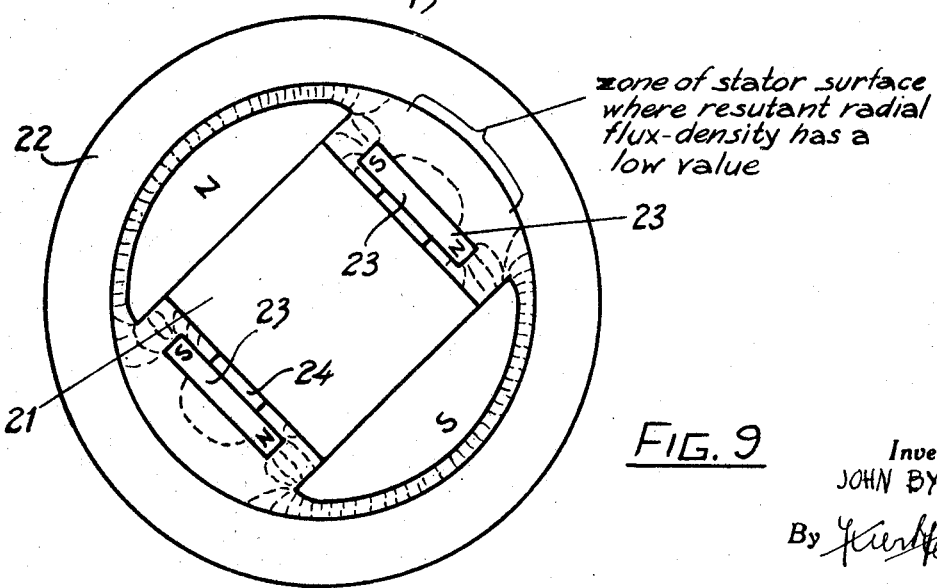

The invention will hereinafter be described more particularly with reference to the accompanying drawings which illustrates, by way of example only, preferred embodiments thereof, and wherein, FIGURE 1 is a diagrammatic view of the rotor, stator and flux distribution in a conventional generator, FIGURE 2 is the flux density distribution of the generator shown in FIGURE 1, FIGURE 3 shows the instantaneous individual conductor voltages induced in a uniformly distributed winding on the stator of FIGURE 1, FIGURE 4 is a sectional elevation of one form of generator according to the present invention, FIGURE 5 is the flux density distribution in the generator shown in FIGURE 4, FIGURE 6 shows the instantaneous voltages inducted in the winding on the stator of FIGURE 4, FIGURE 7 indicates the voltage at successive terminals on the winding on the stator of FIGURE 4, FIGURE 8 is an alternative construction of generator according to the invention, and FIGURE 9 is a further construction of generator according to the invention.

Referring to the accompanying drawings, FIGURE 1 shows, in diagrammatic form, the construction of a conventional generator, and FIGURES 2 and 3 illustrate the related flux distribution and instantaneous conductor voltages in the generator of FIGURE 1.

In accordance with established theory, in each individual active conductor on the stator of FIGURE 1, there is induced a voltage given by the formula:

$$e = BrLu$$

where $e$ = induced voltage
$Br$ = radial component of magnetic flux density
$L$ = conductor length
$u$ = relative velocity of conductor and the flux density.

At constant velocity the conductor voltages are directly proportional to the radial flux density Br. Consequently, the instantaneous voltages of a number of conductors are as shown in FIGURE 3.

Referring now to FIGURE 4 of the accompanying drawings, one form of generator according to this invention comprises a permanent magnet field system or rotor rotatable within a laminated iron stator 2 of toroidal configuration having a uniformly distributed winding 3 provided with equally spaced apart tapping points or terminals 4, the angle subtended between each terminal 4 being 40°.

Mounted on supports 5 of non-magnetic material and rotatable with the rotor 1, is a pair of screening elements 6 so dimensioned that the flux distribution is as shown in FIGURE 4. It will be observed that the zone between each of the screening elements 6 and the adjacent portion of the stator 2 is substantially devoid of flux so that a pair of extended flux restricted zones is provided, each zone subtending an angle of approximately 45°.

The spatial flux distribution in the system shown in FIGURE 4 is plotted, as a function of peripheral distance, in FIGURE 5 and the corresponding instantaneous voltage of each individual active conductor is as illustrated in FIGURE 6. It will be noted that extended zones of zero or substantially zero flux density constitute features of the flux distribution curve, and consequently, no voltage is instantaneously induced in the band of conductors lying in either of the screened zones. Each screened band of conductors therefore constitutes an equipotential. It follows that the voltage difference between the two screened zones is unvarying as will further be appreciated from the following formula developed with reference to FIGURES 5 and 6.

$$dE = u.B_x.L$$
$$= u.B_x.L.z.d_x$$

where $u$ = lineal speed of flux pattern
$L$ = axial length of active conductors
$z$ = conductor lineal density (number per metre)
$B_x$ = radial flux density at position $x$.

Therefore $$E = u.z.L \int_{zone\ 1}^{zone\ 2} B_x dx$$

$= u.z.L$ (area under flux distribution curve)

where $E$ = total voltage between screened zones.

It is clear that E is constant if the flux pattern moves without changing shape or magnitude. Essentially, the summation yields a voltage proportional to the area under the curve between zones 1 and 2 (FIGURES 5 and 6).

This is a constant area if zones 1 and 2 constitute the screened zones, so that the potential difference between a position in screened zone 1 and a position in screened zone 2 will be constant and proportional to the area under the flux distribution curve. The voltage therefore between any two terminals 4, one in each of the screened zones, will have a prolonged substantially flat top the duration of which corresponds to the angular extent of each of the screened zones.

FIGURE 7 shows the voltage waveforms at two successive phase terminals 4 spaced 40° apart in a screened zone of 45° angular extent. It can be seen that there is an overlap corresponding to an angle of 5° during which both phase voltages are simultaneously at the desired flat-topped level.

The screening elements 6 are advantageously constructed from soft iron having high permeability in strong magnetic fields and preferably are formed in two layers 6a and 6b, the layer 6a conducting a high proportion of the leakage flux.

The screening elements 6 should not be very close to the pole shoes as such closeness unnecessarily increases the flux carried by the screening elements 6 and results in deterioration in their screening action. The screening elements 6 should preferably be of bowed shape as shown in FIGURE 4 so that any residual magnetic potential existing between each screening element 6 and the armature surface causes less flux than if the whole entirety of the screening elements 6 were located close to the periphery of the stator 2.

FIGURE 8 shows an alternative embodiment of the invention in which the uniformly distributed toroidal winding 11 is rotatable within a stator 12 having permanent magnetic poles 13 and screening elements or permanent magnets 14 located on non-magnetic supports 15 mounted on the stator 12. The phase terminals 16 may conveniently be connected to commutator segments, as will readily be understood, to provide an output voltage similar to that developed by the generator of FIGURE 4, but reversing in sign with rotation direction.

An armature having skewed slots, such that the windings are effectively uniformly distributed, may be employed instead of the toroidal winding shown in the drawing.

The generator shown in FIGURE 9 comprises a rotor 21, a stator 22 and compensating magnets 23 mounted upon non-magnetic supports 24 secured to the rotor 21, the latter producing the flux pattern shown. The remaining features of the generator are identical to those of FIGURE 4.

It will be understood that the degree of uniformity required in the distribution of the windings depends to a large extent on the degree the output must be ripple free. Accordingly, the greater the degree of uniformity in the distribution of the windings, the lower the amount of ripple in the output.

What is claimed is:

1. An alternating current generator for producing a substantially flat-topped output voltage, said generator comprising a rotor having generator poles and a stator combination for producing a magnetic field in the vicinity of the poles, screening elements located intermediate the generator poles for producing a pair of diametrically opposite screened zones of substantially zero flux density between the poles, a uniform winding for supporting induced voltage, equally spaced terminals on said winding, said terminals being spaced apart by an angular distance less than the angular distance defined by each of said screened zones.

2. An alternating current generator for producing a substantially flat-topped output voltage, said generator comprising a permanent magnet rotor having a pair of poles and rotatable within a stator of toroidal construction, said rotor and stator combination producing a magnetic field of high flux density in the vicinity of said poles, screening elements supported on said rotor and located intermediate said poles for producing, between said poles, a pair of diametrically opposite screened zones of substantially zero flux density extending along the inner periphery of the stator, a uniformly wound toroidal winding on said stator, equally spaced terminals on said winding, said terminals being spaced apart by an angular distance less than the angular distance defined by each of the screened zones.

3. An alternating current generator as claimed in claim 2, wherein said screening elements convey magnetic flux from one pole to the other pole along a path of low reluctance, and a portion of each of said screening elements between the ends thereof being spaced from the periphery of the stator by a distance greater than the distance between each end of each screening element and the stator periphery.

4. An alternating current generator as claimed in claim 2, wherein the improvement comprises a pair of magnets constituting said screening elements.

5. An alternating current generator for producing a flat-topped output voltage, said generator comprising a permanent magnet stator having a pair of poles, a rotor of toroidal construction rotatable in said stator, said rotor and stator combination producing a magnetic field predominently in the vicinity of said poles, screening elements on said stator and located intermediate said poles for producing, between said poles, a pair of diametrically opposite screened zones of substantially zero flux density extending along the outer periphery of the rotor, a uniformly distributed toroidal winding on said rotor, equally spaced terminals on said winding, said terminals being spaced apart by an angular distance less than the angular distance defined by each of the screened zones.

6. An alternating current generator as claimed in claim 5, wherein said screening elements convey magnet flux from one pole to the other pole along a path of low reluctance, a portion of each of said screening elements between the ends thereof being spaced from the periphery of the stator by a distance greater than the distance between each end of each screening element and the stator periphery.

7. An alternating current generator as in claim 5, wherein the improvement comprises a pair of magnets constituting said screening elements.

References Cited

UNITED STATES PATENTS

| | | | |
|---|---|---|---|
| 2,482,526 | 9/1949 | Watson et al. | 310—190 |
| 2,610,993 | 9/1952 | Stark | 310—190 |
| 3,408,556 | 10/1968 | Gabor | 322—95 |

FOREIGN PATENTS

| | | |
|---|---|---|
| 1,071,113 | 6/1967 | Great Britain. |
| 444,515 | 10/1949 | Italy. |

WARREN E. RAY, Primary Examiner

U.S. Cl. X.R.

310—111, 154, 156, 267